No. 623,526. Patented Apr. 25, 1899.
T. DUNCAN.
PHASE ADJUSTMENT.
(Application filed June 13, 1898.)
(No Model.) 5 Sheets—Sheet 1.

WITNESSES
Samuel R. Bachtel
Frank L. Sessions.

INVENTOR
Thomas Duncan
by Carter - Graves
Attys.

No. 623,526.  
T. DUNCAN.  
PHASE ADJUSTMENT.  
(Application filed June 13, 1898.)  
(No Model.)  
Patented Apr. 25, 1899.  
5 Sheets—Sheet 2.

WITNESSES  
Samuel R. Bachtel  
Frank L. Sessions

INVENTOR  
Thomas Duncan  
by Carter & Graves  
Attys.

No. 623,526. Patented Apr. 25, 1899.
T. DUNCAN.
PHASE ADJUSTMENT.
(Application filed June 13, 1898.)

(No Model.) 5 Sheets—Sheet 3.

WITNESSES
Samuel R. Bachtel.
Frank L. Sessions

INVENTOR
Thomas Duncan
by Carter & Graves
Attys.

No. 623,526. Patented Apr. 25, 1899.
T. DUNCAN.
PHASE ADJUSTMENT.
(Application filed June 13, 1898.)
(No Model.) 5 Sheets—Sheet 4.

WITNESSES
Samuel R. Bachtel
Frank L. Sessions

INVENTOR
Thomas Duncan
by Carter & Graves
Attys.

THE NORRIS PETERS CO., PHOTO-LITHO., WASHINGTON, D. C.

No. 623,526. Patented Apr. 25, 1899.
T. DUNCAN.
PHASE ADJUSTMENT.
(Application filed June 13, 1898.)

(No Model.) 5 Sheets—Sheet 5.

WITNESSES
Samuel R. Bachtel.
Frank L. Sessions.

INVENTOR
Thomas Duncan
by Carter & Graves
Attys

UNITED STATES PATENT OFFICE.

THOMAS DUNCAN, OF FORT WAYNE, INDIANA.

PHASE ADJUSTMENT.

SPECIFICATION forming part of Letters Patent No. 623,526, dated April 25, 1899.

Application filed June 13, 1898. Serial No. 683,259. (No model.)

*To all whom it may concern:*

Be it known that I, THOMAS DUNCAN, a citizen of the United States, residing at Fort Wayne, in the county of Allen and State of Indiana, have invented certain new and useful Improvements in Phase Adjustments; and I do hereby declare the following to be a full, clear, and exact description of the invention, such as will enable others skilled in the art to which it appertains to make and use the same.

This invention relates to improvements in methods of and means for securing in an alternating circuit a current in quadrature with its electromotive force.

The invention is particularly applicable to and is herein described in connection with alternating-current meters, although it is not limited thereto.

The invention consists in the matters hereinafter described, and particularly pointed out in the appended claims.

Figure 1:
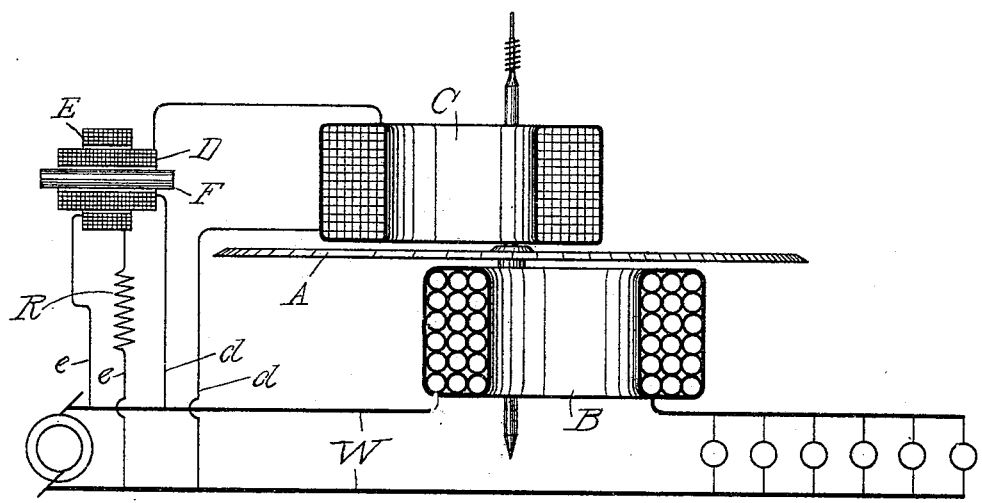
Figure 7:
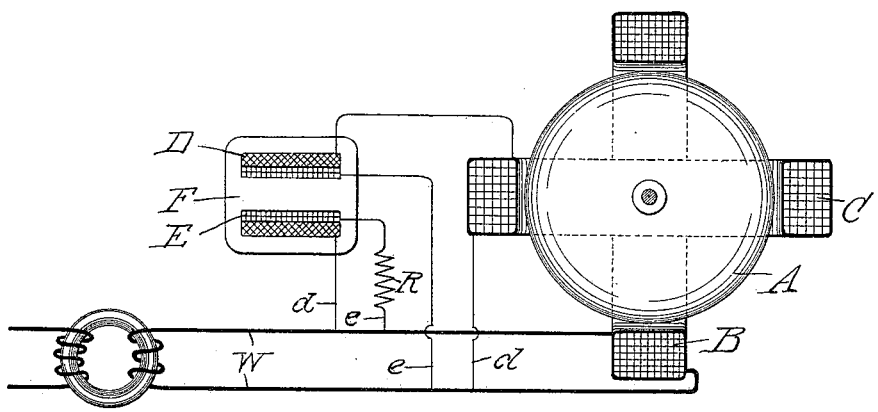
Figure 8:
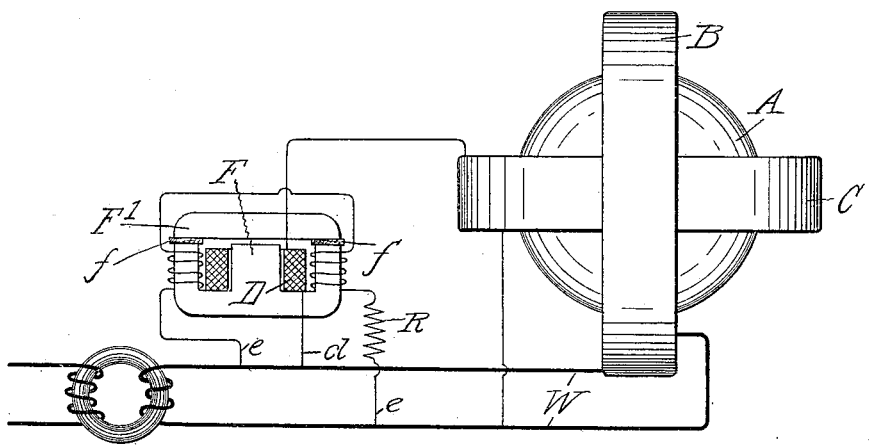
Figure 9:
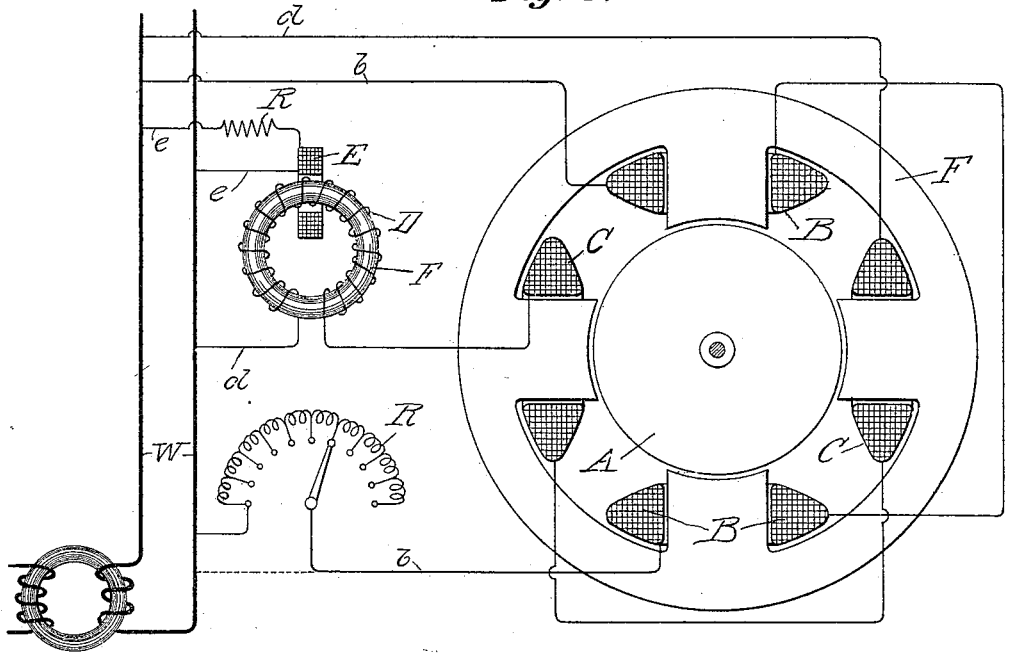

In the accompanying drawings, Figure 1 is a diagrammatic view of a wattmeter embodying the present improvements in one form. Figs. 2, 3, 4, 5, 6, 7, and 8 show various modifications of the impedance-coils and adjusting devices. Fig. 9 illustrates, diagrammatically, a voltmeter construction in accordance with my invention; and Fig. 10, a form of power-motor.

Figure 2:
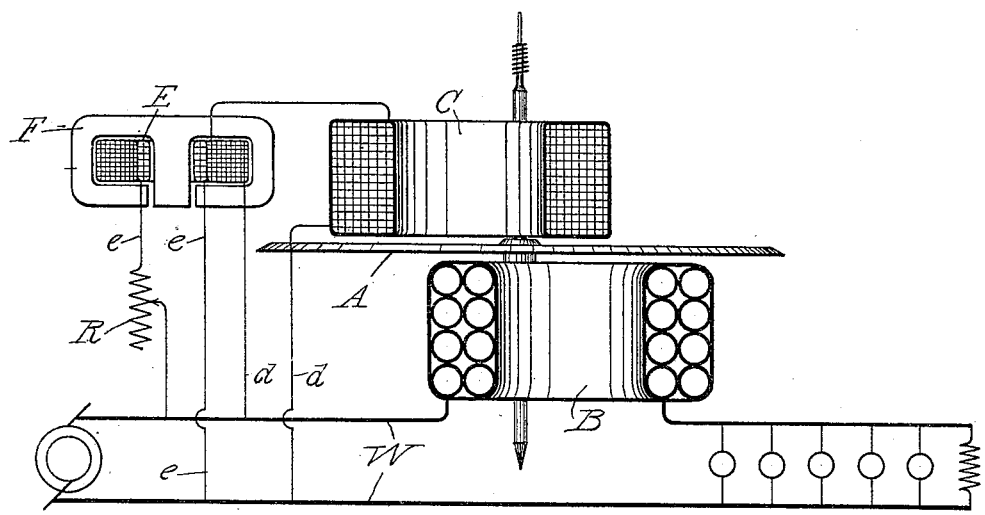
Figure 3:
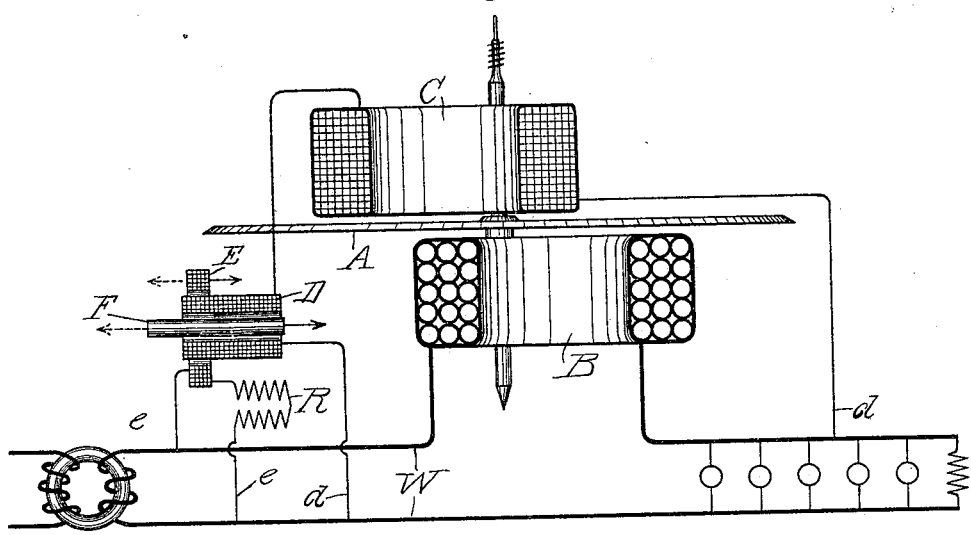
Figure 4:
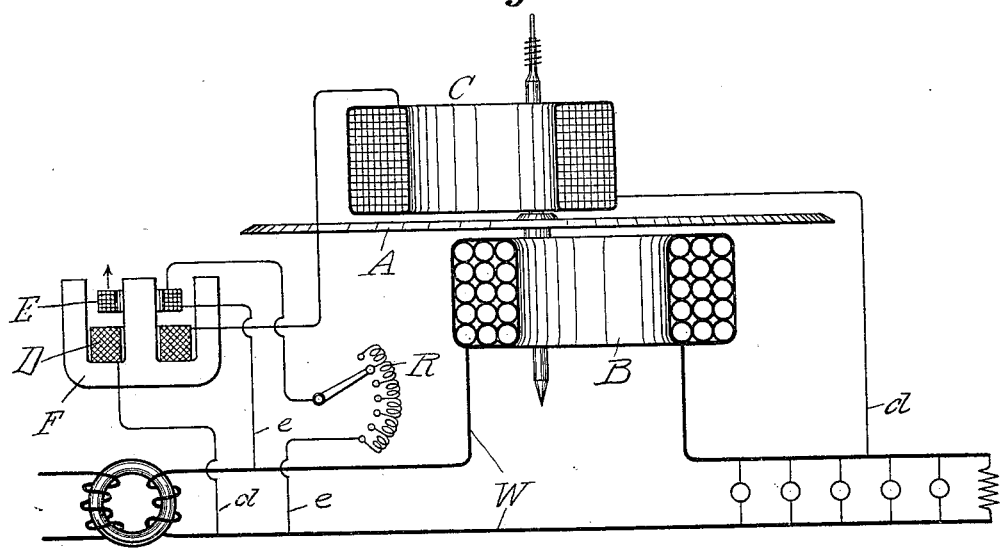
Figure 5:
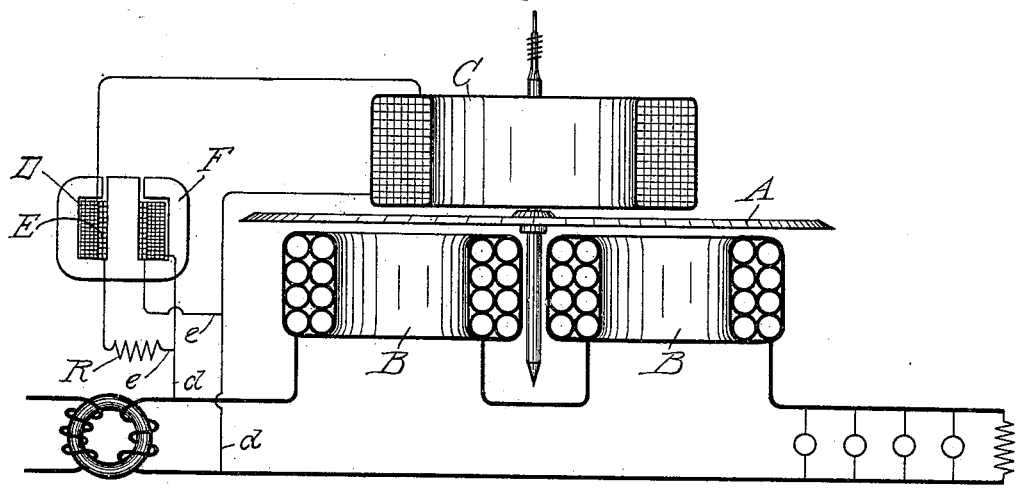
Figure 6:
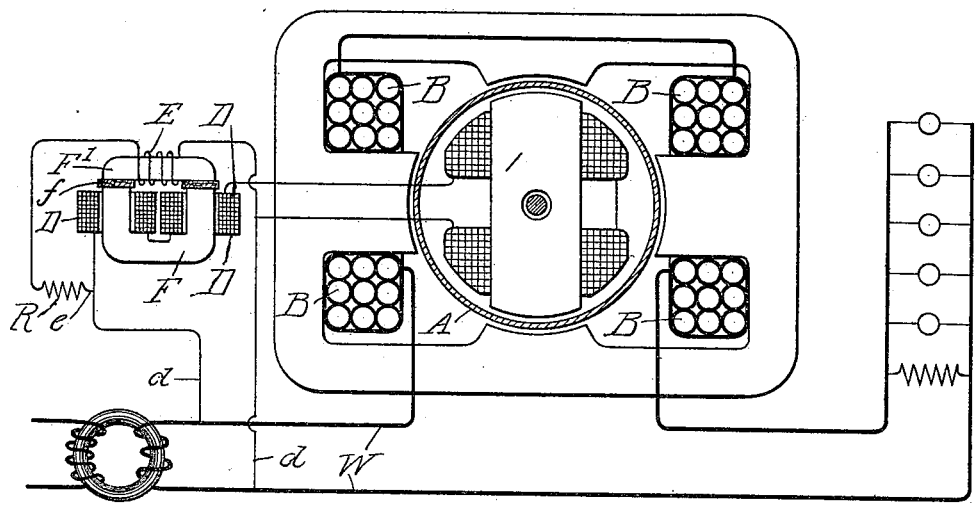

A designates a rotary armature that is actuated in a familiar manner by the inductive influence of series and volt coils B and C, of which the former is connected in series in the work-circuit W and the latter in shunt across the line. An impedance-coil D is inserted in the shunt-circuit with the volt-coil to retard the current therein, and the armature is set in motion by the resultant shifting field arising from this phase displacement. The lag thus produced, however, is less than the ninety degrees necessary to the accurate working of the meter under all conditions of service. Hence the applicability of the present invention, which in this connection involves the introduction of a certain additional feature which I have discovered will increase the lag to the extent desired. This feature consists in a secondary impedance-coil E, energized from the same source as the primary impedance-coil D and operating inductively upon the latter to increase its retarding effect. In Figs. 1 and 3 such secondary impedance-coil E is shown as surrounding the primary coil D, its terminals *e* being connected across the line the same as the terminals *d* of coil D. In Figs. 2, 5, and 7 the opposite arrangement is observed, the secondary coil being shown within the primary coil. In Figs. 4 and 8 the two coils are wound separately upon a common core F, while in Fig. 6 one coil is wound upon the core F and the other upon an armature F', that is removably secured to the core. It will thus be understood that the exact relative arrangement of the coil is not material, so long as it is such as to bring the one within the magnetic field of the other. In every case, however, the size and relative location of the coils will be such as to produce the exact displacement desired in the volt-circuit, and to this end some means of adjustment is desirably provided. This may conveniently consist of a non-inductive resistance R, inserted in the circuit with one of the coils, and the length of which may be readily varied or adjusted; or, as indicated in Figs. 3 and 4, the two coils D and E may be readily adjusted along their common core F, or where one coil is wound upon the core and the other upon a separate armature, as shown in Fig. 6, the core and armature may be held at different distances apart by insulating-blocks *f*, that may be made of any desired thickness.

Figure 10:
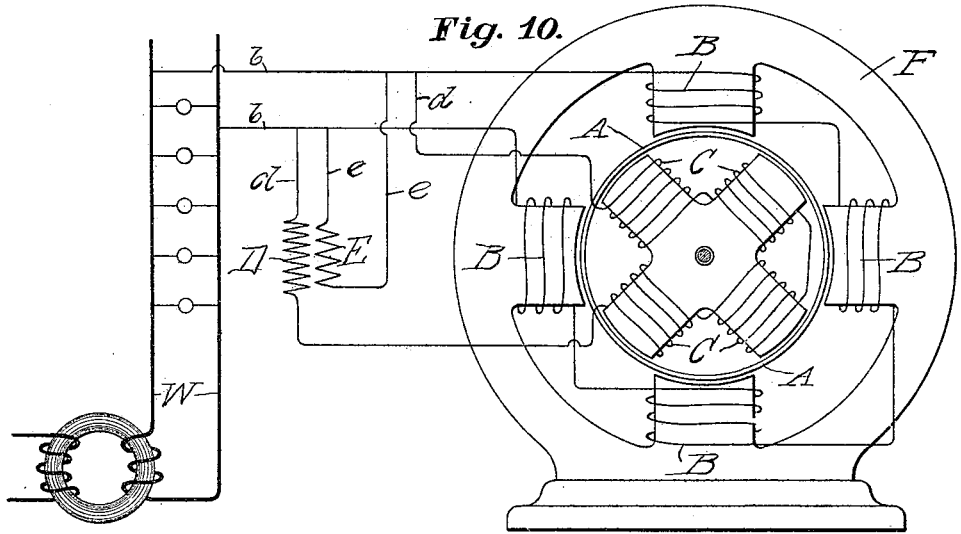

It will be understood that so far as the present invention is concerned it is immaterial how the coils B are connected in circuit, and in Fig. 9 I have shown diagrammatically a form of voltmeter provided with primary and secondary impedance-coils D and E, respectively, in accordance with the principles hereinbefore mentioned, but in which the coils B, as well as the coils C, are in shunt across the line. The same principle of construction may obviously also be used in the building of power-motors, as well as meter-motors, as indicated in Fig. 10. As shown in this figure also, the impedance-coil terminals *d* and *e* are connected with the terminals *b* of the coils B, instead of being directly connected with the main leads, while in Figs. 5 and 6 the terminals *e* of the secondary impedance-coil are shown as connected to the terminals *d* of the impedance-coil D, instead of independently to the main leads. Obviously, however, these slight variations in the connections cannot in any way affect the working of the apparatus. It will also be understood that the same general method will be effective in securing a current in quadrature, with its electromotive force in any alternating circuit, whether in connection with other circuits, as in the motors described, or whether used independently thereof.

I claim as my invention—

1. The method of obtaining a current in quadrature with its electromotive force in an alternating circuit, which consists in utilizing the current to set up a magnetic field by which the current is retarded, and setting up in a secondary circuit a similar magnetic field acting inductively on the first magnetic field to increase its retarding effect.

2. The combination with an armature, of energizing-coils for actuating the armature, a primary impedance-coil wound on a core and connected in series with one of the energizing-coils, a secondary impedance-coil also wound on said core and adjustable relatively to the primary impedance-coil, and connections for separately energizing the secondary impedance-coil from the same sources as the primary impedance-coil.

3. An electric meter provided with an armature, series and volt coils for actuating the armature, a primary impedance-coil connected in the shunt-circuit with the volt-coil, and a secondary impedance-coil in a separate shunt-circuit inductively affecting the primary impedance-coil.

4. As a means of producing a current lag of ninety degrees in an alternating circuit, an impedance-coil connected in said circuit, and a secondary impedance-coil connected in a separate circuit energized from the same source as the first impedance-coil and inductively affecting the latter.

In testimony whereof I affix my signature in presence of two witnesses.

THOMAS DUNCAN.

Witnesses:
 JOHN E. DALTON,
 M. GRACE WEBBER.